June 1, 1965            D. TANN            3,186,048
SELF-TIGHTENING CONNECTOR
Filed July 3, 1963
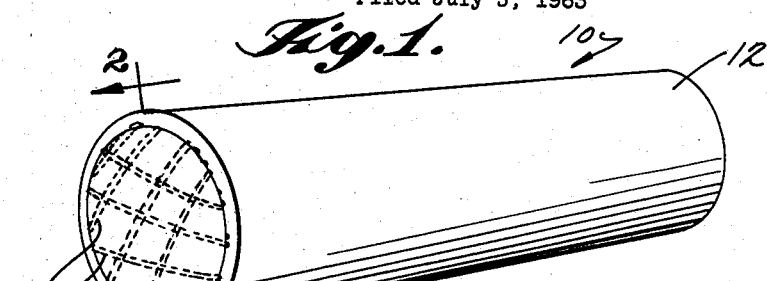
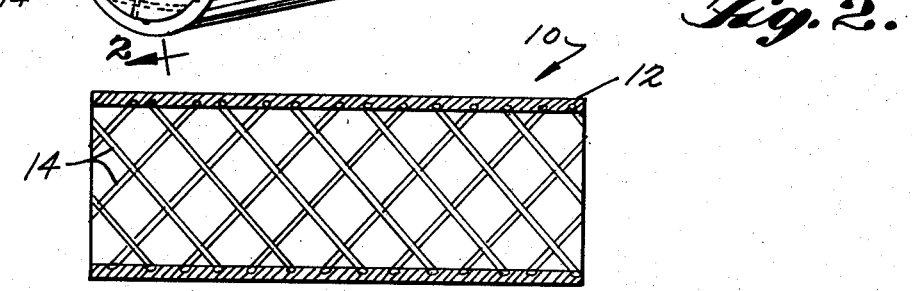
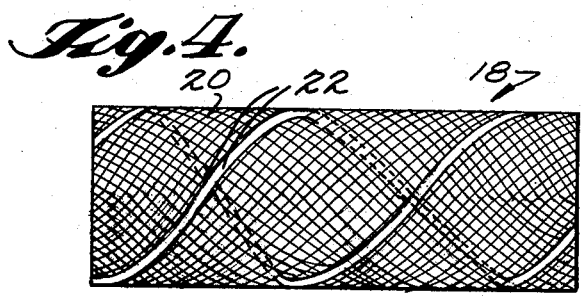
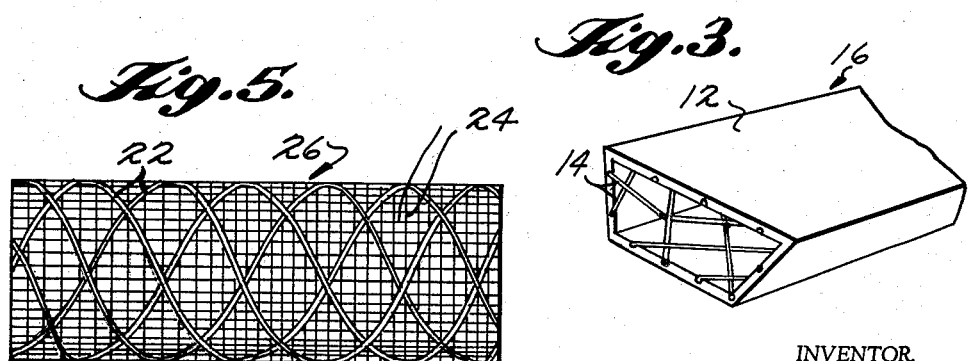
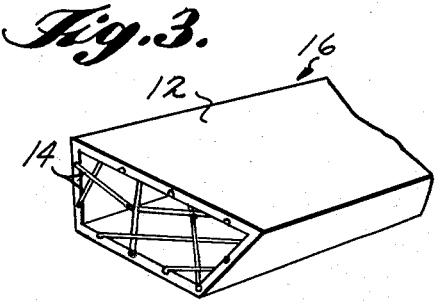
INVENTOR.
DAVID TANN
BY
Lane, Aitken, Dunner & Ziems
ATTORNEYS United States Patent Office 3,186,048
Patented June 1, 1965

3,186,048
SELF-TIGHTENING CONNECTOR
David Tann, 333 Covington Road, Detroit, Mich.
Filed July 3, 1963, Ser. No. 292,603
5 Claims. (Cl. 24—31)

The present invention relates to self-tightening connectors, and more particularly to a sleeve-like connector for connecting opposite ends of a length of belting together to form a continuous drive belt.

Most pulley drive belts are made in one continuous loop. Since different pulley applications require loops with different loop diameters, each jobber or repair outlet must stock the various belt sizes in appropriate numbers. Obviously it would be more advantageous to stock the belts in long lengths wound on reels so that the jobber or repair man could simply cut off the length of belting required to make a particular size pulley belt and connect the free ends together in a simple manner to form the completed belt. Several types of metal connectors have been devised for connecting the free ends of a length of belting to form a continuous pulley belt. But the metal connectors form crude connections which do not ride smoothly around the pulley wheels and consequently produce an objectionable thumping. In addition, the metal connectors are rather difficult to install and do not hold up well in use.

It is one object of the present invention to provide an improved connector for joining together the ends of a length of belting to form a continuous drive belt.

It is another object of the invention to provide a self-tightening, sleeve-like connector which can be fitted easily over the ends of elements, such as drive belts, to connect them together.

It is a further object of the invention to provide a sleeve-like connector of the type described above which is very strong but which is relatively thin walled and flexible so as not to produce objectionable thumping as it rides around the pulley wheels.

It is a still further object of the invention to provide a sleeve-like connector comprising a sleeve of expansible and contractible material supporting oppositely wound helical strands therein which contract when the sleeve is pulled to exert a gripping force on the ends of flexible elements to hold them together.

It is a still further object of the invention to provide a sleeve-like connector of the type described above wherein the oppositely wound helical strands are embedded within a thin sleeve of resilient material such as rubber which holds the strands in position relative to one another to enable them to be slipped over the ends of a pulley belt and contract when tensioned to tightly grip the ends of the belt and thus connect them together.

It is a still further object of the invention to provide a loosely woven sleeve having fibers wound in opposing helixes, spaced ones of said fibers having a greater tensile strength than the remaining fibers to provide the above mentioned gripping action with the remaining fibers serving to retain the stronger gripping fibers in position.

It is a still further object of the invention to provide a method of making sleeve-like connectors of the type described above from a long length of tubing which can be simply cut to length to provide the individual sleeve-like connectors.

It is a still further object of the invention to provide a self-tightening sleeve-like connector for connecting two elements together which is simple and economical to manufacture, easy to install and rugged and effective in use.

Other objects and features of novelty of the present invention will be specifically point out or will otherwise become apparent when referring, for a better understanding of the invention, to the following description taken in conjunction with the accompanying drawings, wherein:

FIG. 1 is a perspective view of a self-tightening connector embodying features of the present invention;

FIG. 2 is a sectional view taken along the line 2—2 of FIG. 1;

FIG. 3 is a perspective view of the connector illustrated in FIG. 1 after it has been formed to a different cross-section;

FIG. 4 is a side view similar to FIG. 1 illustrating another embodiment of the invention; and FIG. 5 is a side view illustrating a modification of the connector illustrated in FIG. 4.

Referring to FIGS. 1 and 2, a self-tightening sleeve-like connector 10 is shown which illustrates one embodiment of the invention. The connector 10 comprises a thin sleeve 12 of a resilient material such as rubber having oppositely wound helical strands 14 embedded therein. The helical strands 14 are similar to those used in what are often referred to in the trade as "comealongs." These are pulling grips made of metal wire formed into opposing helical strands which can be slipped over the end of an electrical cable, for example, to assist in pulling the cable out of a conduit. When the "comealong" is pulled, the helical strands contract and exert a strong gripping force on the end of the cable.

By embedding the helical strands 14 in the resilient sleeve 12, the strands are held in position relative to one another in a manner to enable the sleeve-like connector 10 to be easily slipped over the ends of a pulley belt, for example, to connect them together and form one continuous pulley belt. Because of the resilience of the sleeve 12, the helical strands 14 are free to contract and exert a strong gripping force on the ends of the pulley belt when the sleeve-like connector is tensioned. It is apparent that when used to join the ends of a pulley belt together in this manner, the sleeve-like connector 10 will provide a very strong connection which is simple to install. Because of its flexibility and thin wall, it will readily pass around pulley wheels without causing the objectionable thumping experienced with prior art metallic connectors.

In addition, the sleeve-like connectors 10 can be manufactured in a simple and economical manner by extruding a continuous resilient sleeve 12 with the helical strands 14 embedded therein and cutting the continuous sleeve to predetermined lengths to form the individual sleeve-like connectors 10. Because the helical strands 14 are supported by the resilient sleeve 12, no special provision need by made for the raw or cut ends of the strands at each end of the sleeve-like connector 10. In the aforementioned "comealongs" having the oppositely wound metal helical strands, the metal strands are not supported in this manner, and therefore, must be joined together at the ends by some type of pulling handle or ring, or wound in a continuous fashion by a special process so that no raw or cut ends are formed at one end of the "come-along."

The helical strands 14 of the sleeve-like connector 10 can be made of any suitable flexible material with good tensile strength. Examples of satisfactory materials which may be used for the helical strands are nylon, Teflon, fiberglass, and metal wire or braid. Nylon is the preferred material bacuse of its good tensile strength and flexibility. A sleeve-like connector 10 having helical strands 14 made of nylon will hold up longer in a drive belt application than will a sleeve-like connector having helical strands 14 made of metal wire. The resilient sleeve 12 serves as a support for the strands to hold them in the normal position illustrated in FIGS. 1 and 2 so that they can be slipped over the ends of a drive belt and enable them to contract slightly when tensioned to exert the gripping force on the ends of the drive belt. The sleeve 12 also effectively prevents the cut ends of the strands from getting in the way, as previously described, and provides a protective outer coating which reduces wear on the strands as the sleeve connector passes around the drive wheels.

Referring to FIG. 3, a sleeve-like connector 16 is illustrated which is identical to the sleeve-like connector 10 but is formed with an isosceles trapezoid cross-section by heat and pressure applied to the resilient sleeve 12 after the sleeve-like connector 10 has been cut to length from the continuous sleeve as previously described. The sleeve-like connector 16 will retain this trapezoidal shape so that it can be used to interconnect the ends of a V-belt having the same but slightly smaller cross-section. Of course the sleeve 12 can be molded to other cross-sections corresponding to the cross-section of the elements to be connected together. The connector 10 of FIG. 1 can be used to connect V-belts together since it will conform to the cross-section of the belt. But making the connector with a cross-section corresponding to the cross-section of the particular belt involved improves the connection.

Referring to FIG. 4, a sleeve-like connector 18 is disclosed which illustrates another embodiment of the invention. The connector 18 is woven from oppositely wound helical fibers 20 of nylon, Teflon, fiberglass, or the like, with nylon being preferred, to form a loose mesh sleeve. Spaced oppositely wound helical strands 22 of the open mesh sleeve are formed of the same material as the fibers 20, but with a greater cross-sectional area to provide an increased tensile strength. Alternatively, the strands 22 may be a dissimilar material having a greater tensile strength than the fibers 20. With this construction, the sleeve-like connector 18 will retain the shape illustrated in FIG. 4 so that it can be slipped easily over the ends of the drive belt, and will contract to provide a gripping action when tensioned with the helical strands 22 carrying the greater portion of the load. Consequently the fibers 20 which form the loose mesh sleeve support or hold the helical strands 22 in position, as does the resilient sleeve 12 of the connectors 10 and 16, even though the fibers 20 are not made of a resilient material.

Referring to FIG. 5, a sleeve-like connector 24 is illustrated which is similar to the connector of FIG. 4 with the exception that the oppositely wound helical strands 22 are supported by fibers 24 of a resilient material woven to form a loose mesh sleeve. Because the fibers 24 are resilient, they do not have to be woven with a helical weave pattern. As illustrated in FIG. 5, some of the fibers 24 run parallel to the axis of the sleeve-like connector with the remaining fibers extending circumferentially about the connector perpendicular to the axial fibers. A particular advantage of each of the sleeve-like connectors 18 and 24 illustrated in FIGS. 4 and 5, respectively, is that the connectors are exceptionally flexible and thin walled, so that they will assume readily the cross-sectional shape of the ends to be connected together, and will pass easily around the drive pulley wheels without objectionable thumping.

In the embodiments of FIGS. 1–3, the oppositely wound helical strands 14 are mechanically bonded to the resilient layer 12 by virtue of the fact that they are embedded in the resilient layer 12. Alternatively, the helical strands 14 could be adhesively bonded to the inner surface of the resilient layer 12. In the embodiments of FIGS. 4 and 5, the helical strands 22 are interwoven with the fibers 20 or 24 so that they are mechanically interlocked with the fibers throughout the lengths of the helical strands. Thus the helical strands 22 are in effect mechanically bonded to the loose mesh sleeve formed by the fibers 20 and 22 throughout their lengths just as the helical strands 14 of the embodiments in FIGS. 1–3 are bonded to the resilient sleeve 12 (either mechanically or adhesively) throughout their lengths. This is in direct contrast to prior art gripping devices employing oppositely wound helical strands which are tied together at the ends only.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A self-tightening connector adapted to be fitted over adjacent ends of elements to connect them together comprising oppositely wound helical strands which contract when pulled in a manner to grip the ends of the elements to be connected together and release their grip on the ends when expanded, and a loose mesh woven sleeve which can expand and contract with said strands, said strands being interwoven with said sleeve throughout their lengths so as to be supported and positioned relative to one another by said woven sleeve, the tensile strength of said strands being greater than the tensile strength of said woven sleeve.

2. An endless pulley drive belt comprising a length of drive belting having a trapezoidal cross-section, and a sleeve-like connector fitted over the ends of said belting in a manner to join them together to form an endless pulley drive belt, said sleeve-like connector comprising oppositely wound helical strands which contract when pulled in a manner to grip the ends of said drive belting and to release this grip when expanded, and a thin walled rubber sleeve having a trapezoidal cross-section corresponding to the cross-section of the drive belting, said strands being bonded to said rubber sleeve throughout their lengths so as to be supported and positioned relative to one another by the rubber sleeve, the tensile strength of said strands being greater than the tensile strength of said rubber sleeve whereby the rubber sleeve will readily expand and contract with said strands and the endless pulley belt can pass around pulleys without thumping.

3. The method of making a self-tightening sleeve-like connector, which includes the steps of, forming a flexible tube which contracts when pulled to produce a gripping action comprising an elongated flexible sleeve having oppositely wound helical strands bonded thereto throughout the length of the strands whereby the strands are supported and positioned relative to one another by the flexible sleeve, and cutting said tube into predetermined sleeve lengths to form individual connectors each having said helical strands supported and positioned relative to one another by the sleeve length to which they are bonded.

4. The method of making a sleeve-like connector, which includes the steps of, forming a sleeve of oppositely wound helical strands, covering said strands with a sleeve of resilient material to form a tube having said strands bonded to said resilient material throughout their lengths so as to be supported and positioned relative to one another by said resilient material, and cutting said tube into predetermined lengths to form individual sleeve-like connectors.

5. The method of making a self-tightening sleeve-like connector, which includes the steps of, forming a flexible tube which contracts when pulled to produce a gripping action comprising a loose mesh woven sleeve having oppositely wound helical strands interwoven therewith so that the strands are mechanically bonded to the sleeve throughout their lengths, the tensile strength of said strands being significantly greater than the tensile strength of said sleeve with the strands being supported and retained in position relative to one another by said sleeve, and cutting said tube into predetermined lengths to form individual connectors.

References Cited by the Examiner

UNITED STATES PATENTS

| | | | |
|---|---|---|---|
| 606,557 | 6/98 | Rosenbaum et al. | 24—123.5 |
| 2,034,512 | 3/36 | Geiger et al. | 339—252.5 |
| 2,095,599 | 10/38 | Gleason et al. | 29—412 |
| 2,189,987 | 2/40 | Kellems | 24—123 |
| 2,268,598 | 1/42 | Kellems | 24—123 |
| 2,450,519 | 10/48 | Luther | 24—31 |
| 2,766,501 | 10/56 | Kellems | 24—123.5 |
| 2,852,826 | 9/58 | Carlson | 24—31 |
| 3,067,401 | 12/62 | Rhodes | 339—63 |
| 3,122,806 | 3/64 | Lewis | 24—123.5 |
| 3,123,904 | 3/64 | Hopgood | 29—417 |

DONLEY J. STOCKING, *Primary Examiner.*

BOBBY R. GAY, *Examiner.*